United States Patent
Faibish et al.

(10) Patent No.: US 10,140,032 B1
(45) Date of Patent: Nov. 27, 2018

(54) MULTI-TIER STORAGE SYSTEM WITH DYNAMIC POWER MANAGEMENT UTILIZING CONFIGURABLE DATA MOVER MODULES

(71) Applicant: EMC IP Holding Company LLC, Hopkinton, MA (US)

(72) Inventors: Sorin Faibish, Newton, MA (US); Dennis Ting, Groton, MA (US); James M. Pedone, Jr., West Boylston, MA (US); Percy Tzelnic, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 48 days.

(21) Appl. No.: 15/447,965

(22) Filed: Mar. 2, 2017

(51) Int. Cl.
*G06F 12/00* (2006.01)
*G06F 3/06* (2006.01)

(52) U.S. Cl.
CPC ............ *G06F 3/0611* (2013.01); *G06F 3/065* (2013.01); *G06F 3/0625* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 7,587,559 B2 * | 9/2009 | Brittain | G06F 1/3225 711/154 |
| 8,825,652 B1 | 9/2014 | Faibish et al. | |
| 8,972,465 B1 | 3/2015 | Faibish et al. | |
| 9,223,800 B1 | 12/2015 | Faibish et al. | |
| 2006/0230148 A1* | 10/2006 | Forecast | H04L 69/16 709/226 |
| 2010/0153634 A1 | 6/2010 | Fellinger et al. | |
| 2012/0317338 A1* | 12/2012 | Yi | G06F 12/0868 711/103 |
| 2013/0227194 A1 | 8/2013 | Kannan et al. | |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — John A Lane
(74) *Attorney, Agent, or Firm* — Ryan, Mason & Lewis, LLP

(57) ABSTRACT

An apparatus in one embodiment comprises a storage system having at least first and second storage tiers each comprising a plurality of storage devices. The storage system implements at least one configurable data mover module adapted to interact with the first and second storage tiers and comprising at least one power management configuration file. The data mover module alters a manner in which data is moved between the first and second storage tiers based at least in part on a change in state of the power management configuration file. For example, the data mover module may be configurable via the power management configuration file in a mode of operation in which data movement from the first storage tier to the second storage tier occurs for data files utilized by a given application only after completion of a compute phase for that application.

20 Claims, 2 Drawing Sheets

(56) References Cited

U.S. PATENT DOCUMENTS

| | | | | |
|---|---|---|---|---|
| 2013/0290598 A1* | 10/2013 | Fiske | ................... | G06F 3/0625 |
| | | | | 711/103 |
| 2014/0215041 A1* | 7/2014 | Mann | ..................... | H04L 41/50 |
| | | | | 709/223 |
| 2016/0179184 A1* | 6/2016 | Shah | ..................... | G06F 1/3296 |
| | | | | 713/320 |
| 2018/0095851 A1* | 4/2018 | Zhang | ................ | G06F 11/2023 |

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. filed Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

U.S. Appl. No. 14/973,245 filed in the name of Sorin Faibish et al. filed Dec. 17, 2015 and entitled "Multi-Tier Storage System Having Front-End Storage Tier Implemented Utilizing Software-Defined Storage Functionality."

U.S. Appl. No. 15/185,236 filed in the name of Sorin Faibish et al. filed Jun. 17, 2016 and entitled "Storage System Comprising Cluster File System Storage Nodes and Software-Defined Storage Pool in Cloud Infrastructure."

C. Yan et al., "Hmfs: Efficient Support of Small Files Processing over HDFS," Algorithms and Architectures for Parallel Processing: Lecture Notes and Computer Science, Aug. 2014, pp. 54-67, vol. 8631.

The Apache Software Foundation,"Hadoop Archives Guide," https://hadoop.apache.org/docs/rl.2.1/hadoop_archives.html, 2008, 4 pages.

U.S. Appl. No. 15/064,314 filed in the name of Sorin Faibish et al. filed Mar. 8, 2016 and entitled "Multi-Tier Storage System Configured for Efficient Management of Small Files Associated with Internet of Things."

\* cited by examiner

MULTI-TIER STORAGE SYSTEM WITH DYNAMIC POWER MANAGEMENT UTILIZING CONFIGURABLE DATA MOVER MODULES

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. However, conventional storage tiering arrangements in many contexts can lead to excessive power consumption. For example, in supercomputers and other types of high-performance computer systems that perform computations using hundreds or thousands of compute nodes, excessive storage system power consumption can unduly limit the achievable levels of computational performance.

SUMMARY

Illustrative embodiments provide multi-tier storage systems with dynamic power management utilizing configurable data mover modules. For example, some embodiments limit the power consumption of a multi-tier storage system during compute phases of corresponding compute nodes and perform accelerated TO operations such as checkpointing between the compute phases.

Such embodiments can advantageously provide significantly reduced power consumption relative to conventional techniques commonly utilized in supercomputers and other types of high-performance computer systems. As a result, improved computational performance is achievable in such computer systems and in numerous other contexts involving tiered storage.

In one embodiment, an apparatus comprises a storage system having at least first and second storage tiers each comprising a plurality of storage devices. The storage system implements at least one configurable data mover module adapted to interact with the first and second storage tiers and comprising at least one power management configuration file. The data mover module alters a manner in which data is moved between the first and second storage tiers based at least in part on a change in state of the power management configuration file.

For example, the data mover module may be configurable via the power management configuration file in a mode of operation in which data movement from the first storage tier to the second storage tier occurs for data files utilized by a given application only after completion of a compute phase for that application.

In some embodiments, the data mover module is configurable in at least first and second different modes of operation involving respective first and second different manners of moving data between the first and second storage tiers by storing respective first and second different sets of information in the power management configuration file. As one illustration of such an arrangement, the first mode of operation utilizes a designated minimum data transfer bandwidth and a single thread and the second mode of operation utilizes a designated maximum data transfer bandwidth and multiple parallel threads.

The data mover module may illustratively comprise an application programming interface that permits an external component to control selection between the first and second different modes of operation by directing storage of a particular one of the first and second different sets of information in the power management configuration file. For example, the external component may comprise a job scheduler or an application.

The data mover module in some embodiments is configurable via the power management configuration file in a mode of operation in which data movement from the first storage tier to the second storage tier occurs for a given data file being utilized by an application only after the application has changed an extended attribute of the given data file from a value preventing such data movement to a value permitting such data movement.

The data mover module in some embodiments is implemented using a SYNCer module of a 2 TIERS™ storage system, although other types of data mover modules can be used in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
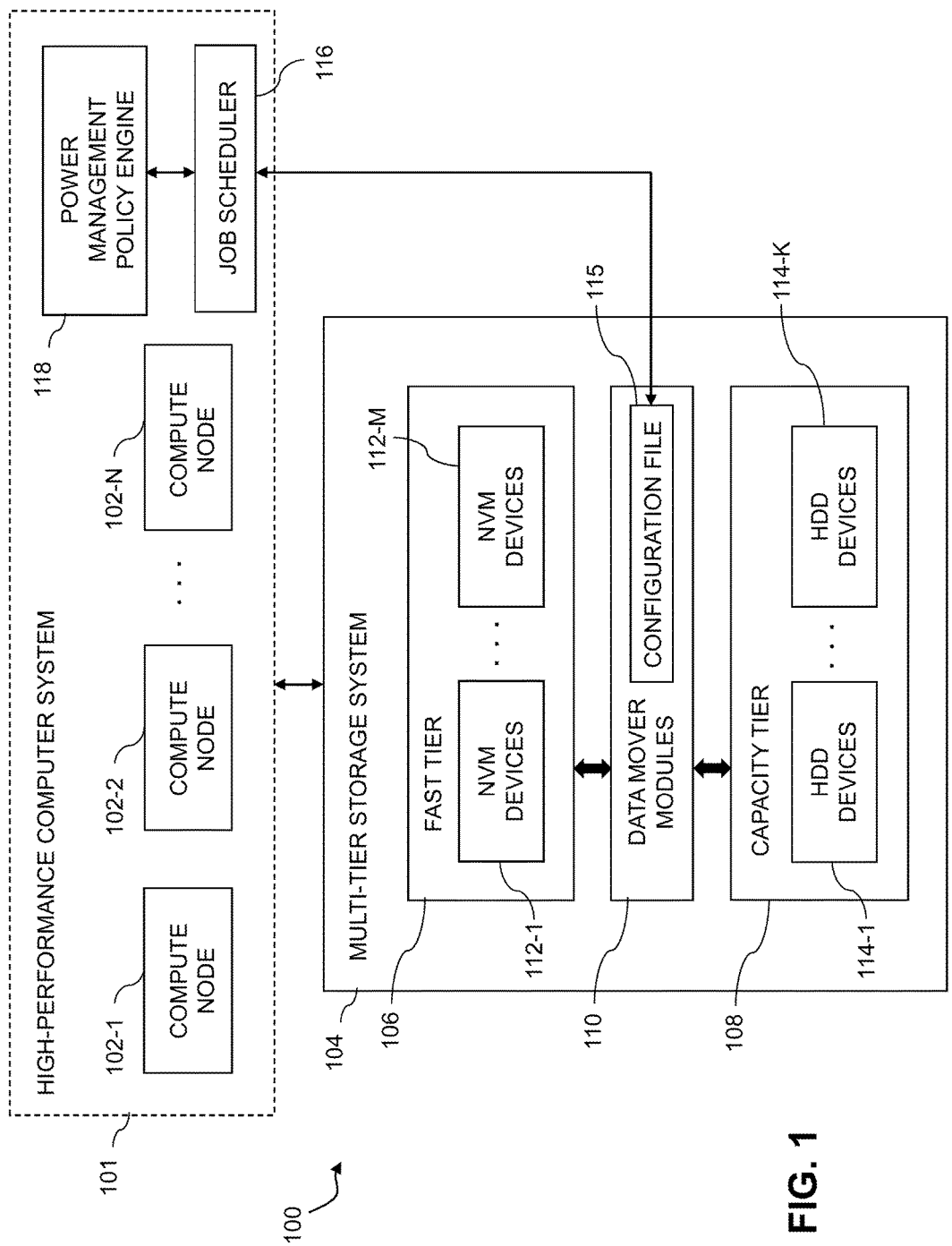
FIG. 1 is a block diagram of an information processing system comprising a multi-tier storage system with dynamic power management utilizing a configurable data mover module in an illustrative embodiment.

FIG. 1 shows an information processing system 100 configured in accordance with an illustrative embodiment. The information processing system 100 comprises a high-performance computer (HPC) system 101 that includes compute nodes 102-1, 102-2, . . . 102-N. The compute nodes 102 communicate with a multi-tier storage system 104 over one or more networks that are not explicitly shown in the figure.

The compute nodes 102 illustratively comprise respective processing devices of one or more processing platforms. For example, the compute nodes 102 can comprise respective virtual machines each having a processor and a memory. Numerous other configurations are possible. The compute nodes 102 in the present embodiment are illustratively part of a supercomputer or other implementation of HPC system 101.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The multi-tier storage system 104 comprises a fast tier 106, a capacity tier 108 and data mover modules 110. The fast tier 106 is an example of what is more generally referred to herein as a "front-end storage tier" or still more generally a "first storage tier" of the multi-tier storage system 104. The capacity tier 108 is an example of what is more generally referred to herein as a "back-end storage tier" or still more generally a "second storage tier" of the multi-tier storage system 104. Other types and arrangements of two or more storage tiers can be used in other embodiments. Each of the fast tier 106 and the capacity tier 108 is assumed to comprise a plurality of storage devices.

The multi-tier storage system 104 in the present embodiment illustratively implements a parallel file system (PFS) comprising one or more sets of storage servers associated with one or more of the fast tier 106 and capacity tier 108. For example, the multi-tier storage system 104 may comprise first and second sets of PFS storage servers implemented in the respective fast tier 106 and capacity tier 108. Each such storage server may be associated with one or more storage devices of its corresponding storage tier.

The storage devices of the fast tier 106 more particularly comprise non-volatile memory (NVM) devices 112-1, . . . 112-M. Examples of such storage devices include flash memory devices, 3D XPoint devices, non-volatile random access memory (NVRAM) devices, or other types of non-volatile memory devices including phase-change RAM (PC-RAM) and magnetic RAM (MRAM). Various combinations of multiple different types of non-volatile memory devices may also be used.

The storage devices of the capacity tier 108 more particularly comprise hard disk drive (HDD) devices 114-1, . . . 114-K. Additional or alternative types of storage devices that may be implemented in the capacity tier 108 include solid state drive (SSD) devices as well as other types of disk-based or electronic memory.

The data mover modules 110 of the multi-tier storage system 104 are configured to move data between the fast tier 106 and the capacity tier 108, for example, by moving data files between different PFS directories of the respective fast and capacity tiers. One or more of the data mover modules 110 can each be implemented at least in part as a PFS component of at least one of the storage tiers.

In this embodiment, the data mover modules 110 comprise respective configurable data mover modules. A given such data mover module is adapted to interact with the fast tier 106 and the capacity tier 108. At least one power management configuration file 115 is implemented in or otherwise associated with one or more of the data mover modules 110. For example, the power management configuration file 115 may be implemented at least in part within a given one of the data mover modules 110 and shared by multiple ones of those modules. Alternatively, each of the data mover modules 110 may comprise its own internal instance of the power management configuration file 115. Accordingly, a power management configuration file as that term is broadly used herein may be associated with a single one of the data mover modules 110 or shared by multiple ones of the data mover modules 110. The relationships between data mover modules and power management configuration files in illustrative embodiments may therefore be one-to-one, many-to-one or one-to-many.

Also, although power management configuration file 115 is shown as being internal to the data mover modules 110 in this embodiment, in other embodiments one or more such configuration files may be implemented externally to the data mover modules 110 in another component of the multi-tier storage system 104. For example, in some embodiments, the power management configuration file or files may be implemented within a component of the HPC system 101 or in an additional system component that is external to both the HPC system 101 and the multi-tier storage system 104.

The state of the power management configuration file 115 is illustratively controlled at least in part by a job scheduler 116 implemented as part of the HPC system 101. The job scheduler 116 interacts with a power management policy engine 118 that is also assumed to be part of the HPC system 101 in this embodiment. In other embodiments, at least one of the job scheduler 116 and the power management policy engine 118 may be implemented at least in part externally to the HPC system 101. For example, one or both of these components may be implemented within the multi-tier storage system 104.

Also, although job scheduler 116 interacts with power management configuration file 115 and power management policy engine 118 in the FIG. 1 embodiment, it is possible that applications running on the compute nodes 102 may additionally or alternatively interact with one or both of the power management configuration file 115 and the power management policy engine 118. Such interaction may be via one or more application programming interfaces (APIs).

The data mover modules 110 in the present embodiment alter a manner in which data is moved between the fast tier 106 and the capacity tier 108 based at least in part on a change in state of the power management configuration file 115. For example, some embodiments limit the power consumption of the multi-tier storage system 104 during compute phases of the corresponding compute nodes 102 and perform accelerated IO operations such as checkpointing between the compute phases. Such an arrangement can significantly reduce the overall power consumption of the information processing system 100.

As a more particular example, one or more of the data mover modules 110 are each illustratively configurable via the power management configuration file 115 in a mode of operation in which data movement from the fast tier 106 to the capacity tier 108 occurs for data files utilized by a given application running on one or more of the compute nodes 102 only after completion of a designated compute phase for that application.

A given "compute phase" as the term is broadly used herein may comprise at least a portion of an application processing job or other compute job that is executed on one or more of the compute nodes 102 at least in part under the control of the job scheduler 116. A compute phase may therefore comprise an entire compute job, or a stage, cycle or other portion of a given such compute job. It is also possible that a compute phase in some embodiments may comprise multiple compute jobs performed by the compute nodes 102.

In some implementations of the FIG. 1 embodiment, one or more of the data mover modules 110 are each configurable in at least first and second different modes of operation involving respective first and second different manners of moving data between the fast tier 106 and the capacity tier 108 by storing respective first and second different sets of information in the power management configuration file 115. For example, a first value stored in at least part of the power management configuration file 115 can direct the data mover modules 110 to enter the first mode of operation and a second value stored in that same part of the power management configuration file 115 can direct the data mover modules 110 to enter the second mode of operation. The data mover modules 110 may be controllable in this manner as a group or alternatively on a per-module basis. In an arrangement of the latter type, values stored in different parts of the power management configuration file 115 can control respective different ones of the data mover modules 110.

The first mode of operation in some embodiments utilizes a designated minimum data transfer bandwidth and a single thread and the second mode of operation utilizes a designated maximum data transfer bandwidth and multiple parallel threads. Numerous other types of first mode and second mode configurations may be used. Also, more than two distinct power management modes may be supported.

One or more of the data mover modules 110 can each include at least one API that permits an external component to control selection between the first and second different modes of operation by directing storage of a particular one of the first and second different sets of information in the power management configuration file 115. For example, the job scheduler 116 can access the power management configuration file 115 via such an API in order to control the mode of operation of one or more of the data mover modules 110. Additionally or alternatively, an application running on one or more of the compute nodes 102 can access the power management configuration file 115 via the API in order to control the mode of operation of one or more of the data mover modules 110.

In some embodiments, at least one of the data mover modules 110 is configurable via the power management configuration file 115 in a mode of operation in which data movement from the fast tier 106 to the capacity tier 108 occurs for a given data file being utilized by an application running on one or more of the compute nodes 102 only after the application has changed an extended attribute of the given data file from a value preventing such data movement to a value permitting such data movement. In an arrangement of this type, the data mover modules 110 can be placed in a mode of operation in which particular types of data movement are performed for certain data files based at least in part on extended attributes of those data files as established via the parallel file system.

Additionally or alternatively, at least one of the data mover modules 110 may be configurable via the power management configuration file 115 in a mode of operation in which data movement from the fast tier 106 to the capacity tier 108 occurs for a given set of checkpoint files associated with a given application running on one or more of the compute nodes 102 only after completion of a compute phase for that application.

For example, if the number of checkpoint files in the given set of checkpoint files that are stored in the fast tier 106 reaches a designated maximum number of checkpoint files before completion of the compute phase for the application, an oldest one of the checkpoint files is overwritten with a new checkpoint file without moving any of the checkpoint files to the capacity tier 108.

The particular operating modes of the data mover modules 110 that are based at least in part on a current state of at least a portion of the power management configuration file 115 are presented by way of example only and should not be viewed as limiting in any way. Additional or alternative operating modes can be used in other embodiments.

In some embodiments, the HPC system 101 illustratively comprises a supercomputer configured to provide levels of performance on the scale of peta-flops ("PFlops") or $10^{15}$ floating-point operations per second. Power consumption in conventional HPC systems and their associated storage systems presents a major barrier to the expansion of supercomputers to exascale levels of performance at 1000 PFlops or $10^{18}$ floating-point operations per second. The dynamic power management techniques disclosed herein can significantly reduce the power consumption of an HPC system and its associated multi-tier storage system in a manner that can facilitate the achievement of higher levels of performance. This is implemented in one or more of the illustrative embodiments by controlling data movement via a configuration file in a manner that minimizes power consumption at least in part by IO acceleration between compute phases of the compute nodes of the HPC system. For example, data movement between the fast tier 106 and the capacity tier 108 can be performed in an accelerated manner primarily in conjunction with the completion of compute phases of the HPC system 101 when power consumption of that system is relatively low.

Accordingly, illustrative embodiments provide enhanced power efficiency in implementation of a multi-tier storage system comprising fast and capacity tiers. This may include minimizing power consumed by the multi-tier storage system while its corresponding HPC system is performing compute tasks.

Although the multi-tier storage system 104 is shown in FIG. 1 as being entirely separate from the HPC system 101, this is by way of illustrative example only. In other embodiments, at least a subset of the storage devices 112-1, . . . 112-M of the fast tier 106 may be implemented in respective ones of the compute nodes 102. Numerous other alternative system configurations are also possible.

Accordingly, a given one of the storage devices 112-1, . . . 112-M of the fast tier 106 may in some embodiments comprise a flash memory device, a 3D XPoint device, an NVRAM device or another type of non-volatile memory device of one of the compute nodes 102, or another type of storage device of such a compute node. In an arrangement of this type, at least one of the compute nodes 102 implements at least a portion of the fast tier 106 of the multi-tier storage system 104.

Processing devices utilized to implement system components such as the data mover modules 110 are assumed to be interconnected with one another using high-speed connections. For example, data can be moved between these and other system components using remote direct memory access (RDMA) connections over Gigabit Ethernet ("GbE") or InfiniBand ("IB"). As another example, some embodiments can be configured to utilize an Intel Omni-Path Host Fabric Interface (OP HFI). Numerous other types of connections and associated data transfer protocols can be used in other embodiments, including Fibre Channel.

In some embodiments, the fast tier 106 is implemented at least in part using software-defined storage such as ScaleIO™ or ViPR® both of which are commercially available from Dell EMC of Hopkinton, Mass. Additional details regarding ScaleIO™ functionality that can be incorporated into a multi-tier storage system in illustrative embodiments can be found in, for example, EMC ScaleIO™ User Guide, V1.32, Document No. 302-001-033, Rev. 11, May 2015, which is incorporated by reference herein.

The capacity tier 108 in some embodiments is implemented at least in part utilizing a scale-out network-attached storage (NAS) cluster and/or an object store.

For example, the capacity tier 108 can include a scale-out NAS cluster implemented using Isilon® platform nodes and associated accelerators in the S-Series, X-Series and NL-Series product lines, all commercially available from Dell EMC.

Additionally or alternatively, the capacity tier 108 can include an object store implemented using cloud storage such as Elastic Cloud Storage (ECS) from Dell EMC. Other examples of object stores that can be used in a given embodiment include object stores implemented using object-based storage products such as Atmos, also from Dell EMC.

The capacity tier 108 in some embodiments includes an object store that is part of the same cloud infrastructure that provides the compute nodes 102. Examples of cloud-based object stores that can be utilized for object store in some embodiments include Amazon Simple Storage Service (S3), GCP Cloud Storage, and Microsoft Azure Blob Storage.

A given such object store of the capacity tier 108 is configured to store a plurality of objects. Each of the objects stored in the object store is assumed to have a unique object identifier (OID). It is also possible that the capacity tier 108 could comprise multiple object stores, or other types of object storage.

A specified set of objects stored in the object store may be made accessible to an application running on a given one of the compute nodes 102 via a corresponding dynamically loadable namespace (DLN) identifier. The DLN identifier is associated with a DLN object stored in the object store, with the DLN object comprising identifiers of respective ones of the objects in the specified set.

In some embodiments, a translator at least partially incorporated in or otherwise associated with the multi-tier storage system 104 implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of an object store of the capacity tier 108 are made accessible to the application via the name node. The translator via the translation services and the at least one index table permits applications running on respective compute nodes having no knowledge of the object storage structure of the object store to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed Sep. 30, 2015 and entitled "Translation-Based Name Node Configuration for Object Access in a Multi-Tier Storage System," which is commonly assigned herewith and incorporated by reference herein.

Again, the fast tier 106, capacity tier 108 and data mover modules 110 are all assumed to be part of the multi-tier storage system 104 of information processing system 100, although other arrangements are possible in other embodiments. For example, components such as data mover modules 110 in other embodiments can be implemented at least in part externally to the multi-tier storage system 104.

Also, it should be noted that data mover modules 110 that are shown as separate from the fast tier 106 and capacity tier 108 in the FIG. 1 embodiment can be implemented at least in part within at least one of the tiers. For example, the data mover modules 110 can be implemented in a distributed manner using storage nodes that are used to implement respective portions of at least one of the fast and capacity tiers.

It is assumed that the fast tier 106 has a relatively high input-output processing speed and a relatively low capacity and the capacity tier 108 has a relatively low input-output processing speed and a relatively high capacity, although other types of multi-tier storage systems can be used in other embodiments.

The data mover modules 110 are illustratively coupled to the fast tier 106 and the capacity tier 108 and configured to control transfer of data between these storage tiers. The term "data movement" as used in this and other contexts herein is intended to be broadly construed, so as to encompass data migration as well as other types of movement of data between storage tiers of a multi-tier storage system. A given data mover module can be implemented at least in part on storage arrays or other storage platforms that implement at least portions of one or more of the storage tiers of the multi-tier storage system 104.

As indicated previously, each of the fast tier 106 and the capacity tier 108 of the multi-tier storage system 104 comprises a plurality of storage devices with different types of storage devices being used in different ones of the storage tiers. For example, the fast tier 106 may comprise flash drives while the capacity tier 108 comprises hard disk drives or solid state drives. The particular storage devices used in a given storage tier may be varied in other embodiments, and multiple distinct storage device types may be used within a single storage tier. The term "storage device" as used herein is intended to be broadly construed, so as to encompass, for example, flash drives, hard disk drives, solid state drives, hybrid drives or other types of storage devices.

The storage devices utilized in the fast tier 106 are generally significantly faster in terms of read and write access times than the storage devices utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Such alternative arrangements can include, for example, one or more intermediate storage tiers arranged between the front-end and back-end storage tiers of a multi-tier storage system 104.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 106 and the capacity tier 108 of the multi-tier storage system 104 are implemented at least in part utilizing a 2 TIERS™ storage system from Dell EMC. By way of example, a given 2 TIERS™ storage system may comprise DSSD™ server-based flash storage devices utilized to implement at least portions of fast tier 106, and a scale-out NAS cluster and/or an object store utilized to implement at least a portion of capacity tier 108. In such an arrangement, an IO dispatcher software layer of the 2 TIERS™ storage system may be configured to provide at least a portion of the data mover modules 110. For example, such an IO dispatcher software layer can be used to pre-fetch data from the capacity tier 108 into the fast tier 106, as well as to support other types of data movement. In some embodiments, this functionality is performed utilizing SYNCer modules of the 2 TIERS™ storage system.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 110 may be configured to control movement of data between the fast tier 106 and the capacity tier 108 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 110 can communicate with the compute nodes 102, fast tier 106 and capacity tier 108 via one or more networks or other types of communication media. In distributed implementations, different modules or other portions of a given distributed system component such as data mover modules 110 can be implemented in respective ones of a plurality of storage nodes.

It is to be appreciated that these and other features of illustrative embodiments are presented by way of example only, and should not be construed as limiting in any way.

Accordingly, different numbers, types and arrangements of system components such as compute nodes 102, fast tier 106, capacity tier 108 and data mover modules 110 can be used in other embodiments.

The fast tier 106, capacity tier 108, data mover modules 110 and possibly other elements of the system 100 can be implemented using one or more storage platforms. For example, a given storage platform can comprise any of a variety of different types of storage including storage area networks (SANs), direct-attached storage (DAS) and distributed DAS, as well as combinations of these and other storage types, including software-defined storage. A given storage platform may comprise storage arrays such as VNX® and Symmetrix VMAX® storage arrays or scale-out all-flash storage arrays such as XtremIO™, all commercially available from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The data mover modules 110, as well as other system components, may be implemented at least in part using processing devices of such processing platforms.

For example, in a distributed implementation of the data mover modules 110, such modules may be implemented in respective LXCs running on respective ones of the compute nodes 102 or on storage nodes of the fast tier 106 or capacity tier 108.

Communications between the various elements of system 100 may take place over one or more networks not explicitly shown. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as Gigabit Ethernet, InfiniBand, Omni-Path Host Fabric Interface or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, the fast tier 106 in other embodiments can be implemented using storage devices and associated storage servers of at least a subset of the compute nodes 102. For example, a given one of the compute nodes 102 as illustrated can include a PFS storage server associated with local flash storage devices of the compute node. Other ones of the compute nodes 102 may similarly implement respective PFS storage servers and associated local flash storage devices so as to collectively provide the fast tier 106. The capacity tier 108 in some embodiments is implemented using storage nodes each comprising a PFS storage server and one or more corresponding storage devices.

The operation of the information processing system 100 will now be described in further detail with reference to the flow diagram of FIG. 2. The process as shown includes steps 200 through 204, and is suitable for use in the system 100 but is more generally applicable to other types of systems comprising a multi-tier storage system providing dynamic power management utilizing one or more configurable data mover modules.

In step 200, a multi-tier storage system is configured to include at least first and second storage tiers each comprising multiple storage devices. As mentioned previously, the multi-tier storage system in some embodiments implements a parallel file system comprising one or more sets of storage servers, such as first and second sets of storage servers in the respective first and second storage tiers. By way of example, in some embodiments the parallel file system is implemented using OrangeFS ("OFS") although other embodiments can utilize other types of parallel file systems including GPFS, Lustre and PVFS. Parallel file systems in some implementations of this type are also sometimes referred to as "distributed file systems" or "cluster file systems."

In step 202, a configurable data mover module is implemented in the multi-tier storage system. The configurable data mover module is adapted to interact with the first and second storage tiers and comprises a power management configuration file. The configurable data mover module may comprise one of a plurality of data mover modules arranged to move data between the first and second storage tiers. Each such data mover module may be separately configurable by a job scheduler, application or other component of the information processing system that includes the multi-tier storage system.

In step 204, a manner in which data is moved between the first and second storage tiers is altered in the configurable data mover module based on a current state of the power management configuration file.

Figure 2:
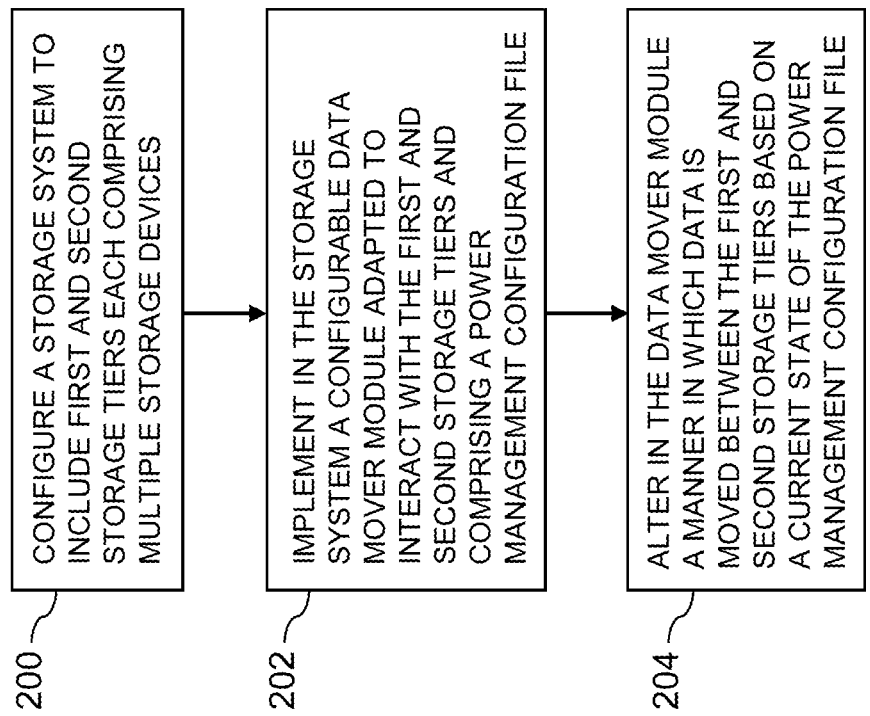
FIG. 2 is a flow diagram of a process for dynamic power management utilizing a configurable data mover module in an illustrative embodiment.

For example, in some implementations of the FIG. 2 process, the data mover module is configurable via the power management configuration file in a mode of operation in which data movement from the first storage tier to the second storage tier occurs for data files utilized by a given application only after completion of a compute phase for that application.

As another example, the data mover module is illustratively configurable in at least first and second different modes of operation involving respective first and second different manners of moving data between the first and second storage tiers by storing respective first and second different sets of information in the power management configuration file.

Numerous additional or alternative modes of operation controllable via the power management configuration file can be used.

With reference by way of example to the previously-described FIG. 1 embodiment, the first and second storage tiers of the FIG. 2 process illustratively comprise the respective fast tier 106 and capacity tier 108 and the configurable data mover module of the FIG. 2 process comprises one of the data mover modules 110. The power management configuration file utilized to control the manner in which data is moved between the first and second storage tiers by the data mover module comprises at least a portion of the power management configuration file 115. Such an arrangement is an illustrative example of what is more generally referred to herein as dynamic power management utilizing configurable data mover modules.

The multi-tier storage system in the illustrative embodiments of FIGS. 1 and 2 may be implemented at least in part utilizing the above-noted 2 TIERS™ storage system from Dell EMC. More particularly, the data mover (DM) functionality of the multi-tier storage system is implemented at least in part utilizing SYNCer modules of the 2 TIERS™ storage system. Accordingly, data mover modules of the multi-tier storage system are illustratively implemented as respective 2 TIERS™ SYNCer modules. Such SYNCer modules are illustratively part of an IO dispatcher software layer of the 2 TIERS™ storage system.

Movement of data between the storage tiers of the multi-tier storage system is illustratively controlled by SYNCer modules configured to perform data movement operations such as movement of data files from a storage node of the fast tier to a storage node of the capacity tier and vice-versa.

Numerous different conditions can lead to movement of data between the storage tiers in the FIG. 2 embodiment and other embodiments disclosed herein. In some embodiments, the SYNCer modules of the 2 TIERS™ storage system are controlled via a power management configuration file to minimize power consumption attributable to storage access and other types of data movement. This illustratively involves scheduling of certain types of data movement only during times between compute phases of the compute nodes of an HPC system. For example, data movement between a capacity tier and a fast tier can be scheduled before a given compute job begins using a policy that allows movement of only scheduled files from the capacity tier to the fast tier. Other files are permitted to be moved only on demand during the compute job. A similar policy is used to delay movement of files from the fast tier to the capacity tier until the given compute job is complete. Such power management policies can be provided to a job scheduler such as job scheduler 116 of the FIG. 1 embodiment from its corresponding power management policy engine 118. Power management policies of this type are distinct from conventional data movement policies that simply seek to maximize 10 performance or reduce the runtime of the compute job.

In some embodiments, the SYNCer modules are implemented at least in part within OFS and are tightly coupled with OFS file operations. SYNCer modules can be configured to provide eager tiering, in which files are moved from a capacity tier to a fast tier prior to start of a compute job, and lazy tiering, in which files are moved from the capacity tier to the fast tier at the time the files are first opened. On-demand delivery can also be provided, in which 10 from data files is delivered directly to an application running on one or more compute nodes only upon request. Similar policies are implemented for movement from the fast tier to the capacity tier when a given file is closed and placed on a "dirty list" within OFS. Files on the "dirty list" include those files that are being written by one or more applications.

Illustrative embodiments herein supplement these data movement policies with power management policies that explicitly take into account power consumption requirements when moving data. For example, such power management policies can be configured to limit movement of data during a compute phase, to allow data to be moved only upon completion of a compute phase, to move data under application control using a SYNCer API, and to retain data movement operations for a designated time period in order to prevent repeated writing of the same data file from the fast tier to the capacity tier. These and other power management policies may be controlled at least in part by a power management policy engine such as power management policy engine 118 in the FIG. 1 embodiment.

Additional examples of power management policies that are configurable within a given SYNCer module or other data movement module via an associated power management configuration file include the following power management policies relating to data movement from the fast tier to the capacity tier:

1. Any files on the dirty list that must be moved will be moved only after the last file is closed and a specified waiting time from the close has expired.

2. Any files on the dirty list will be moved only when there is less than a designated threshold percentage of free space available on the fast tier.

3. Any files on the dirty list will be moved unless there is an application lock on those files that indicates that the files should be retained. An application can utilize an OF S extended attribute to mark a given file as locked. The SYNCer module will verify that there is no lock on a given file before moving it.

Other examples of power management policies that are configurable within a given SYNCer module or other data movement module via an associated power management configuration file include the following power management policies relating to data movement from the capacity tier to the fast tier:

1. Files are always eagerly moved to the fast tier if requested by a job scheduler or by an application using the SYNCer API.

2. Files are not moved to the fast tier at first open but instead only on IO request.

3. On IO request, the SYNCer module will only copy the requested IO and no additional data is tiered until the next IO request unless more than a designated threshold number n of sequential IOs are detected.

4. Files will be retained in the fast tier until there are no additional files opened for IO in the OFS. Such a condition will tend to indicate that the compute job is complete.

5. Files are copied to the capacity tier during a compute job only if those files are being scheduled.

The foregoing power management policies are only examples, and numerous additional or alternative policies can be used in other embodiments.

For example, in some embodiments, the data movement from the fast tier to the capacity tier is throttled to a minimum bandwidth and performed using a single thread during a compute phase unless specifically overridden by the job scheduler or by the application using OFS extended attributes. A maximum bandwidth and multiple parallel threads will be only used if scheduled prior to the start of compute job or after the end of the compute job, the latter possibly during DLN unload.

In some embodiments, a power management policy controls the manner in which checkpointing is performed within the multi-tier storage system. For example, such a policy can be used to postpone the copying of checkpoints from the fast tier to the capacity tier. In an arrangement of this type, the copying of checkpoints from the fast tier to the capacity tier is postponed as long as there is a designated threshold amount of free space in the fast tier. If the designated threshold amount of free space is not available, an oldest one of the checkpoints stored in the fast tier is overwritten with a new checkpoint. This will considerably reduce the power consumption of the capacity tier until the end of the compute job and at that point only the last m checkpoints of the fast tier are moved to the capacity tier.

As another example, consider an application that uses a large number of opened files and writes IOs randomly to each of them. Under one or more of the above-described power management policies, if a given one of the files is closed, the SYNCer module will not automatically move that file to the capacity tier. Instead, the file remains in the fast tier, possibly until the corresponding compute phase is complete, and as a result may be overwritten multiple times in the fast tier without being moved to the capacity tier each time. The application can use OFS extended attributes to direct the SYNCer module not to move the opened files until their extended attributes are changed by the application at the completion of the compute phase. In some embodiments, the application can direct the movement of the files by changing their extended attributes in situations in which corresponding compute nodes of the HPC system are waiting for other processes to complete as indicated for example by certain message passing interface (MPI) communications.

The data movement in step 204 of the FIG. 2 process in some embodiments can include movement of data files between a temporary directory of the first storage tier and a permanent directory of the second storage tier.

An extended attribute exclusively associating a given one of the directories with a particular one of the sets of servers may be assigned by a job scheduler via one or more APIs of the multi-tier storage system in conjunction with creation of the given directory.

An application running on a compute node determines whether to write a given data file to a directory of the first storage tier or to a directory of the second storage tier based at least in part on respective extended attributes of those directories exclusively associating the directories with respective ones of the first and second sets of servers.

At least a portion of the servers of the first set are illustratively generated as respective new server instances on one or more compute nodes in order to provide a requesting application with access to storage devices of those compute nodes as part of the first storage tier of the storage system.

As indicated above, some embodiments utilize OFS in combination with SYNCer modules of a 2 TIERS™ storage system. For example, such an arrangement allows an application to add OFS storage server instances on demand to a directory exclusively associated with local flash devices or NVMe ("Non-Volatile Memory Express") devices of a fast tier. The application can increase the number of OFS storage server instances of the directory as needed to achieve a desired IO latency. After the processing job is complete, the data can be moved to a directory exclusively associated with higher latency storage devices on a capacity tier. A SYNCer module may be utilized to move the data from the directory of the fast tier to the directory of the slower capacity tier. The directory of the fast tier can be a temporary directory that is deleted by the SYNCer module after the movement of the data to a permanent directory of the capacity tier is completed. Such an arrangement provides an efficient and flexible mechanism for temporary 10 acceleration responsive to the particular demands of an application.

As one example, consider an analytics application that detects the use of an input data set that includes large numbers of small files such as those generated by Internet of Things (IoT) sensors. It is further assumed that the analytics application can process a wide variety of different types of data and that it does not know the particular characteristics of the input data set in advance. Upon detection of the input data set with large numbers of small files, the application can write the files to a temporary directory that is exclusively associated with storage servers and storage devices of the fast tier so as to optimize IO performance. The application identifies the temporary directory using its OFS extended attribute and locks the temporary directory while the input data set is being processed so that the temporary directory cannot be deleted or moved. After the processing of the input data set is complete, the application removes the lock and this will indicate to the SYNCer module that the data can be moved from the temporary directory to a permanent directory exclusively associated with the slower capacity tier. The SYNCer module can also delete the temporary directory from the fast tier.

As another example, if an application knows the particular characteristics of an input data set in advance, a job scheduler can be used to create a temporary directory on the appropriate storage tier in advance.

It is to be appreciated that the FIG. 2 process can be adapted for use with a wide variety of other types of multi-tier storage systems, including by way of example a multi-tier storage system in which the fast tier comprises burst buffer appliances and/or a software-defined storage pool, and a multi-tier storage system in which the capacity tier comprises a scale-out NAS cluster and/or an object store.

The particular processing operations and other system functionality described in conjunction with the flow diagram of FIG. 2 are presented by way of illustrative example only, and should not be construed as limiting the scope of the embodiments in any way. Alternative embodiments can use other types of processing operations involving a multi-tier storage system that provides dynamic power management utilizing configurable data mover modules. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different storage system instances within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Numerous other embodiments of information processing systems comprising compute nodes and a multi-tier storage system can be configured utilizing the techniques disclosed herein. Such embodiments can utilize a wide variety of additional or alternative storage tiering and data movement arrangements.

It should therefore be understood that the particular system configurations and operations described above are presented by way of illustrative example only, and should not be construed as limiting in any way. Numerous alternative configurations of compute nodes, storage tiers, data mover modules and other system elements can be used in other embodiments. For example, although some embodiments utilize OFS, the disclosed techniques can be extended in a straightforward manner to any of a wide variety of alternative parallel file systems.

In these and other embodiments, a multi-tier storage system can be offered to cloud infrastructure customers as a platform-as-a-service offering.

Illustrative embodiments of multi-tier storage systems with dynamic power management as disclosed herein can provide a number of significant advantages relative to conventional arrangements.

For example, some embodiments limit the power consumption of the multi-tier storage system during compute phases of corresponding compute nodes and perform accelerated IO operations such as checkpointing between the compute phases. Such arrangements substantially reduce the power consumption of at least the capacity tier of the multi-tier storage system at times when relatively large amounts of power are consumed by the HPC system and accelerate the IO operations of the storage system at other times when relatively small amounts of power are consumed by the HPC system.

These and other embodiments can advantageously provide significantly reduced overall power consumption relative to conventional techniques commonly utilized in supercomputers and other types of HPC systems.

As a result of the significantly reduced power consumption, improved computational performance is achievable in such HPC systems and in numerous other contexts involving tiered storage.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered examples of illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102 and multi-tier storage system 104 comprising fast tier 106, capacity tier 108 and data mover modules 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute nodes, storage systems, storage tiers, storage devices, file systems, directories and data mover modules. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
a storage system comprising at least first and second storage tiers each comprising a plurality of storage devices;
the storage system implementing at least one configurable data mover module adapted to interact with the first and second storage tiers and comprising at least one power management configuration file;
wherein the data mover module alters a manner in which data is moved between the first and second storage tiers based at least in part on a change in state of the power management configuration file;
wherein the data mover module is configurable in at least first and second different modes of operation involving respective first and second different manners of moving data between the first and second storage tiers by storing respective first and second different sets of information in the power management configuration file; and
wherein the first mode of operation utilizes at least one of a different data transfer bandwidth and a different number of threads than the second mode of operation.

2. The apparatus of claim 1 wherein the storage devices of the first storage tier comprise respective non-volatile electronic memory devices and the storage devices of the second storage tier comprise respective hard disk drive devices.

3. The apparatus of claim 1 wherein the first storage tier implements a parallel file system comprising a plurality of storage servers associated with respective ones of the storage devices of the first storage tier.

4. The apparatus of claim 3 wherein the data mover module is implemented at least in part as a component of the parallel file system of the first storage tier.

5. The apparatus of claim 1 wherein the second storage tier implements an object store in which stored data objects have respective unique object identifiers.

6. The apparatus of claim 1 wherein the data mover module is configurable via the power management configuration file in a mode of operation in which data movement from the first storage tier to the second storage tier occurs for data files utilized by a given application only after completion of a compute phase for that application.

7. The apparatus of claim 1 wherein the first mode of operation utilizes a designated minimum data transfer bandwidth and a single thread and the second mode of operation utilizes a designated maximum data transfer bandwidth and multiple parallel threads.

8. The apparatus of claim 1 wherein the data mover module comprises an application programming interface that permits an external component to control selection between the first and second different modes of operation by directing storage of a particular one of the first and second different sets of information in the power management configuration file.

9. The apparatus of claim 8 wherein the external component comprises at least one of a job scheduler and an application.

10. The apparatus of claim 1 wherein the data mover module is configurable via the power management configuration file in a mode of operation in which data movement from the first storage tier to the second storage tier occurs for a given data file being utilized by an application only after the application has changed an extended attribute of the given data file from a value preventing such data movement to a value permitting such data movement.

11. The apparatus of claim 1 wherein the data mover module is configurable via the power management configuration file in a mode of operation in which data movement from the first storage tier to the second storage tier occurs for a given set of checkpoint files associated with a given application only after completion of a compute phase for that application.

12. The apparatus of claim 11 wherein if the number of checkpoint files in the given set of checkpoint files that are stored in the first storage tier reaches a designated maximum number of checkpoint files before completion of the compute phase for the application, an oldest one of the checkpoint files is overwritten with a new checkpoint file without moving any of the checkpoint files to the second storage tier.

13. The apparatus of claim 1 further comprising a plurality of compute nodes wherein at least one of the compute nodes implements at least a portion of the first storage tier of the storage system.

14. A method comprising:
configuring a storage system with at least first and second storage tiers each comprising a plurality of storage devices;
implementing in the storage system at least one configurable data mover module adapted to interact with the first and second storage tiers and comprising at least one power management configuration file; and
altering in the data mover module a manner in which data is moved between the first and second storage tiers based at least in part on a change in state of the power management configuration file;
wherein the data mover module is configurable in at least first and second different modes of operation involving respective first and second different manners of moving data between the first and second storage tiers by storing respective first and second different sets of information in the power management configuration file; and
wherein the first mode of operation utilizes at least one of a different data transfer bandwidth and a different number of threads than the second mode of operation.

15. The method of claim 14 wherein the data mover module is configurable via the power management configuration file in a mode of operation in which data movement from the first storage tier to the second storage tier occurs for data files utilized by a given application only after completion of a compute phase for that application.

16. The method of claim 14 wherein the first mode of operation utilizes a designated minimum data transfer bandwidth and a single thread and the second mode of operation utilizes a designated maximum data transfer bandwidth and multiple parallel threads.

17. The method of claim 14 wherein the data mover module is configurable via the power management configuration file in a mode of operation in which data movement from the first storage tier to the second storage tier occurs for a given set of checkpoint files associated with a given application only after completion of a compute phase for that application.

18. A non-transitory processor-readable storage medium having stored therein program code of one or more software programs, wherein the program code when executed by a processing platform causes said processing platform:
to configure a storage system to comprise at least first and second storage tiers each comprising a plurality of storage devices;
to implement in the storage system at least one configurable data mover module adapted to interact with the first and second storage tiers and comprising at least one power management configuration file; and
to alter in the data mover module a manner in which data is moved between the first and second storage tiers based at least in part on a change in state of the power management configuration file;
wherein the data mover module is configurable in at least first and second different modes of operation involving respective first and second different manners of moving data between the first and second storage tiers by storing respective first and second different sets of information in the power management configuration file; and
wherein the first mode of operation utilizes at least one of a different data transfer bandwidth and a different number of threads than the second mode of operation.

19. The processor-readable storage medium of claim 18 wherein the data mover module is configurable via the power management configuration file in a mode of operation in which data movement from the first storage tier to the second storage tier occurs for data files utilized by a given application only after completion of a compute phase for that application.

20. The processor-readable storage medium of claim 18 wherein the first mode of operation utilizes a designated minimum data transfer bandwidth and a single thread and the second mode of operation utilizes a designated maximum data transfer bandwidth and multiple parallel threads.

* * * * *